US008647030B2

(12) United States Patent
Duncan et al.

(10) Patent No.: US 8,647,030 B2
(45) Date of Patent: Feb. 11, 2014

(54) CORE DRILLING SYSTEM WITH TORQUE SHAFT

(76) Inventors: C. Warren Duncan, Santa Ana, CA (US); Anders Johnsen, Borlange (SE)

( * ) Notice: Subject to any disclaimer, the term of this patent is extended or adjusted under 35 U.S.C. 154(b) by 893 days.

(21) Appl. No.: 12/795,242

(22) Filed: Jun. 7, 2010

(65) Prior Publication Data

US 2011/0135412 A1 Jun. 9, 2011

Related U.S. Application Data

(60) Provisional application No. 61/186,292, filed on Jun. 11, 2009.

(51) Int. Cl.

*B23B 47/18* (2006.01)
*B23B 47/26* (2006.01)

(52) U.S. Cl.

USPC ......... 408/72 R; 408/129; 408/204; 175/239; 175/249

(58) Field of Classification Search

USPC ........... 408/57, 67, 72 R, 129, 204, 234, 238; 175/232, 239, 249

See application file for complete search history.

(56) References Cited

U.S. PATENT DOCUMENTS

| | | | | |
|---|---|---|---|---|
| 2,409,578 | A | 10/1946 | McDonald | |
| 2,991,966 | A | 7/1961 | Varel | |
| 3,094,179 | A | 6/1963 | Lines | |
| 3,412,813 | A | 11/1968 | Johnson | |
| 3,810,514 | A | 5/1974 | Viscovich | |
| 3,844,697 | A | 10/1974 | Edwards | |
| 4,375,931 | A * | 3/1983 | Erdt | 408/234 |
| 5,393,175 | A | 2/1995 | Courville | |
| 5,735,645 | A | 4/1998 | Dungs | |
| 6,019,551 | A * | 2/2000 | Stephenson | 408/92 |
| 6,179,718 | B1 * | 1/2001 | Morath et al. | 470/57 |
| 6,881,016 | B2 | 4/2005 | May | |
| 7,484,578 | B2 | 2/2009 | Duncan | |
| 7,658,242 | B2 | 2/2010 | Duncan | |
| 2004/0009045 | A1 | 1/2004 | Reichenberger et al. | |
| 2004/0151552 | A1 | 8/2004 | Baratta | |
| 2004/0191014 | A1 | 9/2004 | May | |
| 2008/0179105 | A1 | 7/2008 | Duncan | |

* cited by examiner

*Primary Examiner* — Jermie Cozart

(74) *Attorney, Agent, or Firm* — Stetina Brunda Garred & Brucker

(57) ABSTRACT

A core drilling system is disclosed herein in which a torque tube has a groove or keyway which receives a rotating wheel or key to prevent a transmission box and motor from rotating during drilling operation. As such, the operator does not need to hold a stabilizing arm to resist counter rotational forces during the drilling process. The operator may focus on the hole to be cut in a substrate. Additionally, a torque tube stabilizing leg assembly may be secured to the free distal end portion of the torque tube.

10 Claims, 15 Drawing Sheets

FIG. 3
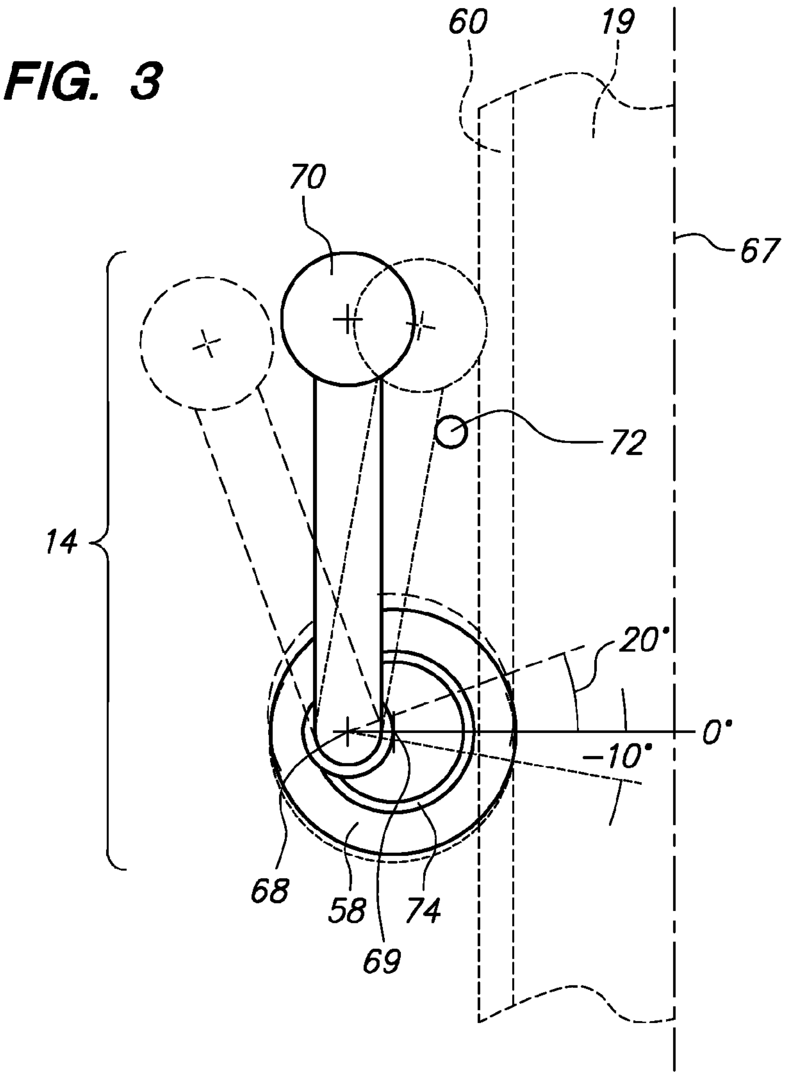
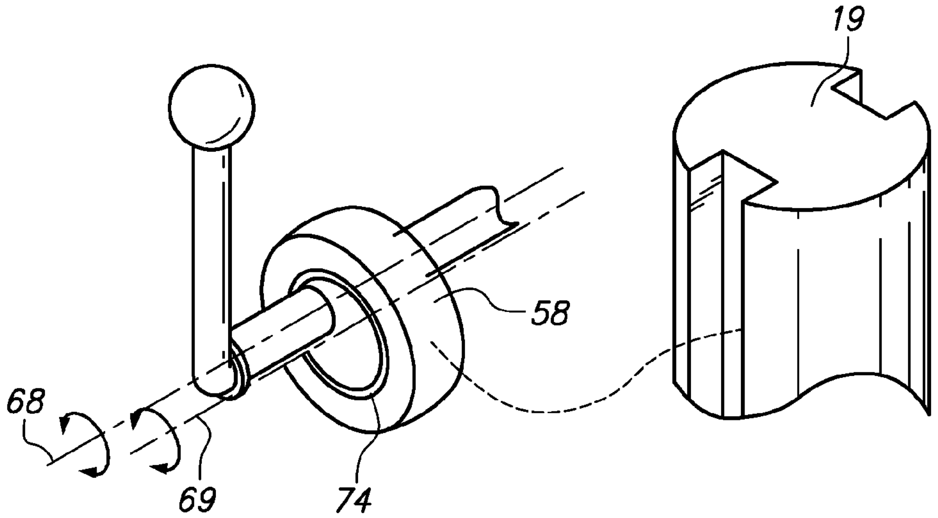
FIG. 3A

FIG. 5D
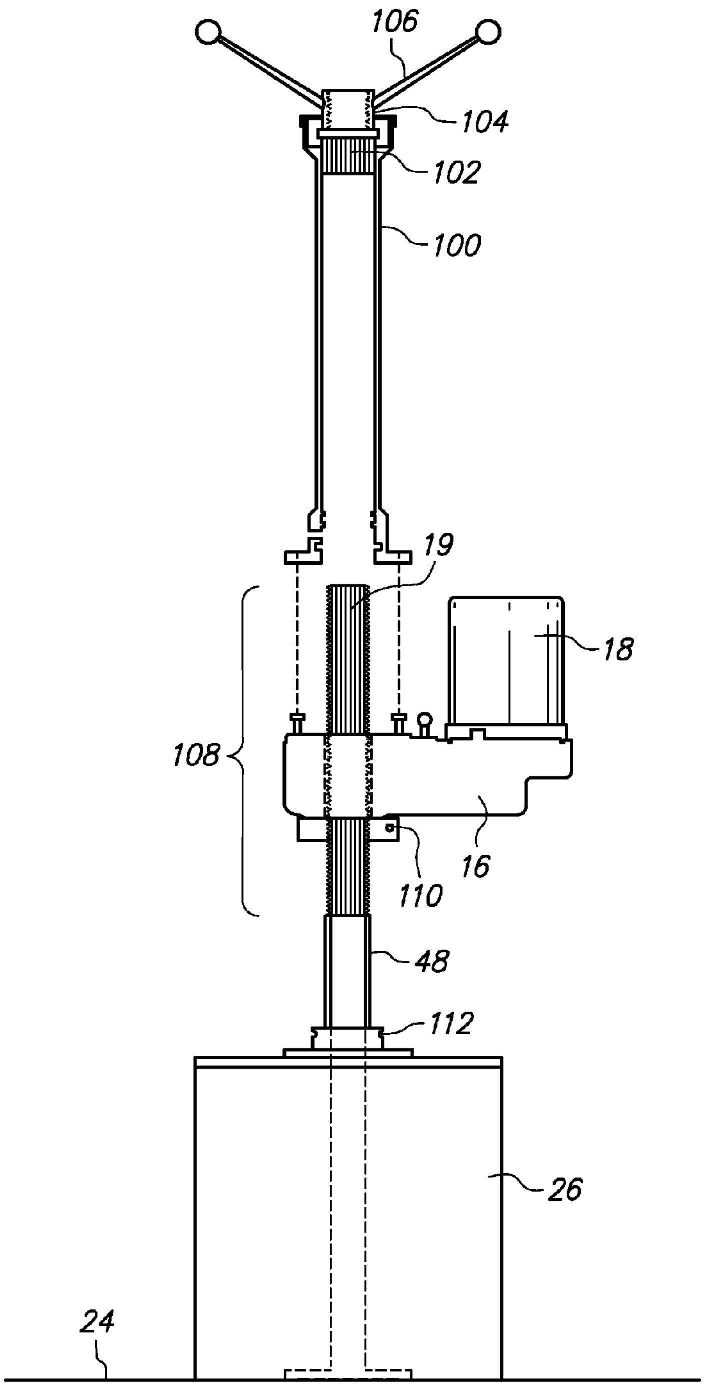
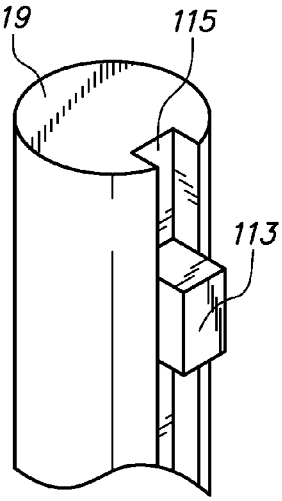
FIG. 5E

CORE DRILLING SYSTEM WITH TORQUE SHAFT

CROSS-REFERENCE TO RELATED APPLICATIONS

This application claims the benefits of U.S. Prov. Pat. App. Ser. No. 61/186,292, filed Jun. 11, 2009, the entire contents of which are expressly incorporated herein by reference.

STATEMENT RE: FEDERALLY SPONSORED RESEARCH/DEVELOPMENT

Not Applicable

BACKGROUND

This application is related to a hole coring system for forming a hole in a substrate such as concrete.

U.S. Pat. No. 7,484,578 ('578 patent), issued to Warren Duncan of U.S. Saws, Inc. discloses a unique and beneficial way of forming a hole in a substrate. Conventionally, a hole is formed in concrete through the use of a drill press like device such as a drill rig. Initially, the location of the hole in the substrate is located. The drill press is attached to the substrate adjacent the hole with a chuck of the drill press disposed over the center of the hole to be cut. A concrete hole drilling bit is secured to the chuck of the drill press after the drill press is securely attached to the substrate. The drill bit is rotated by the drill press and a handle of the drill press is rotated to push the drill bit toward the substrate for forming the hole in the substrate. Unfortunately, in this scenario, the drill press does not apply an even load on the drill bit due to the nonsymmetrical setup. The device disclosed in the '578 patent uniquely applies downward pressure to the drill bit from a guide post centrally located at the location of the substrate to be cut and asymmetrically aligned to the rotating axis of the drill bit.

For larger holes, a stabilizing arm is used. This embodiment is disclosed in U.S. patent application Ser. No. 12/009,169 ('169 application), now U.S. Pat. No. 7,658,242, filed on Jan. 17, 2008, the entire contents of which is expressly incorporated herein by reference. The '169 application is a continuation-in-part application of the application which matured into the '578 patent. The stabilizing arm is shown in FIG. 25 of the '169 application. Unfortunately, the stabilizing arm is very bulky and requires the user to hold the stabilizing arm during the drilling operation. As a workaround, a brace may be secured nearby to hold the stabilizing arm. However, the brace and the stabilizing arm require an extra setup thus making the hole coring system a bit cumbersome and inconvenient. Also, a counter reaction force to the force on the arm or brace provides a side load on the post of the drilling system thereby bending the post. Moreover, any spikes in the load creates spikes in the torque which may cause the drilling system to undesirably vibrate.

BRIEF SUMMARY

The core drilling system disclosed herein addresses the needs discussed above, discussed below and those that are known in the art. Among other aspects, the core drilling system has a feed wheel assembly and a pinch wheel assembly that engages a torque tube. The feed wheel assembly and/or the pinch wheel assembly prevents rotation of a transmission box and motor during drilling operation. An external torque arm is not required. Additionally, one or more stabilizing legs may be attached to the free distal end portion of the torque tube to capture the substrate after the drill bit has drilled through the substrate when drilling in a generally vertical direction.

More particularly, a coring apparatus for forming a hole in a substrate is disclosed. The apparatus may comprise an elongate torque shaft, a core bit, a transmission, a key and a means for driving the core bit towards the substrate. The elongate torque shaft may be attached to a section of the substrate to be cut. The shaft may have a cylindrical outer surface and a groove extending along a length of the tube. The core bit may have a cylindrical configuration. A first end of the core bit may have a cutting configuration (e.g., abrasive, teeth, etc.) for forming an outer periphery of the hole to be cut into the substrate. A second end of the core bit may have a bearing that can rotate on the outer surface of the elongate torque shaft to align the core bit to the substrate and slidable on the outer surface to traverse the core bit along the length of the shaft. The transmission may be attached to a motor for transmitting power from the motor to an output of the transmission. The output of the transmission may be coupled to the core bit for imparting rotation of the core bit about the elongate torque shaft. The key may be fixed to the transmission and slideably disposable within the groove of the elongate torque shaft to prevent rotation of the transmission and/or motor about the torque shaft during rotation of the core bit.

The apparatus may further comprise a means for stabilizing the free end portion of the torque shaft. By way of example and not limitation, at least one leg (e.g., standard drilling rig, tripod, unileg, etc.) may be attached to the substrate and fixed to the free end portion of the torque shaft. The leg may be attached to the free end portion of the torque shaft with a split conical collar disposed about the torque shaft.

The apparatus may further comprise a pinch wheel feed assembly. The assembly may comprise the key and a pinch wheel disposed on an opposite side of the elongate shaft with respect to the key. The pinch wheel may move the transmission and/or motor up and down the shaft.

The torque shaft may be solid throughout or hollow through a central axis of the shaft for flowing fluid or gas therethrough. The core bit may be a concrete core bit.

Additionally, a coring apparatus for forming a hole in a substrate is disclosed. The apparatus may comprise an elongate shaft, a core bit, a transmission and a means for preventing rotation of the transmission box and/or motor about the torque shaft. The elongate torque shaft may be attached to a section of the substrate to be cut. The shaft may have a cylindrical outer surface. The core bit may have a cylindrical configuration. A first end of the core bit may have a cutting configuration for forming an outer periphery of the hole to be cut into the substrate. A second end of the core bit may have a bearing rotateable on the outer surface of the elongate torque shaft to align the core bit to the substrate and slidable on the outer surface to traverse the core bit along the length of the shaft. The transmission may be attached to a motor for transmitting power from the motor to an output of the transmission. The output of the transmission may be coupled to the core bit for imparting rotation of the core bit about the elongate torque shaft. The means for preventing rotation of the transmission and/or motor may prevent rotation about the torque shaft during rotation of the core bit.

The means for preventing rotation may be a key and groove, pins and holes, rack and pinion, spline or combination thereof.

A method of coring a substrate is disclosed. The method may comprise the steps of attaching a torque shaft to the substrate at a location to be cut; sliding a core bit onto the torque shaft; engaging a motor and transmission to the core bit to rotate the core bit; step for preventing rotation of the motor and transmission during rotation of the core bit; and applying pressure to the core bit toward the substrate to cut the substrate.

The step for preventing rotation may include the step of sliding a key attached to the transmission and/or motor down a groove formed in the torque shaft during the applying step.

The step for preventing rotation may alternatively include inserting pins into holes formed in the torque shaft, rolling a pinion on a rack formed in the torque shaft, rolling a square tooth gear into a square shaped groove, sliding a splined part down a splined outer surface of the torque shaft, or combinations thereof.

The method may further comprise the step of securing a free distal end portion of the torque shaft to the substrate or other stationary object. The securing step may include the step of attaching the free distal end portion of the torque shaft to a standard drill rig or attaching the free distal end portion of the torque shaft to a leg(s). The securing step also include the step of applying tension in the torque shaft for assisting in the stabilization of the torque shaft.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 3 illustrates movement of the disc of the pinch wheel assembly;

FIG. 3A is a perspective view of the pinch wheel assembly and torque tube;

FIG. 5D illustrates a further alternate embodiment of the feed wheel assembly;

FIG. 5E illustrates a key sliding within a groove;

DETAILED DESCRIPTION

Figure 1:
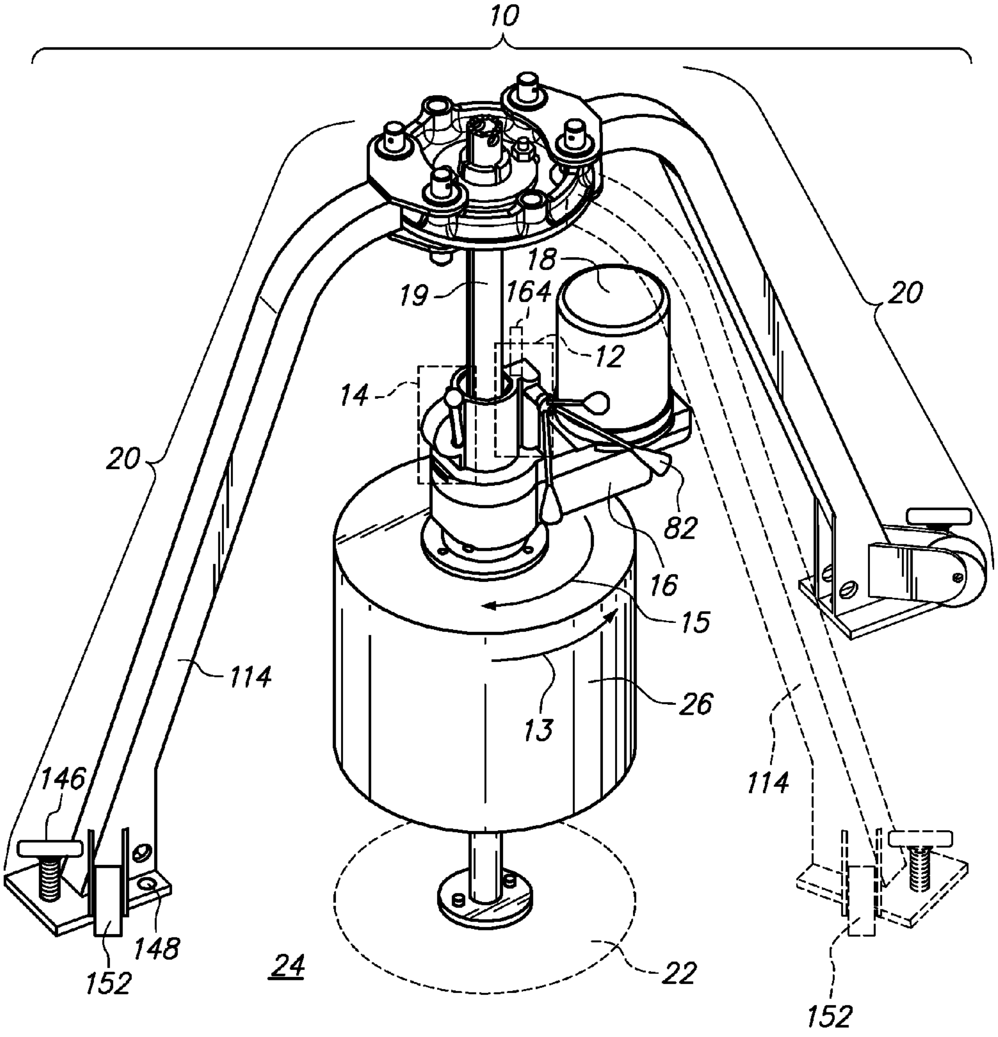
FIG. 1 is a perspective view of a core drilling system having a feed wheel assembly, pinch wheel assembly and torque tube stabilizing leg assembly.

Referring now to the drawings, FIG. 1 illustrates a core drilling system 10 having a feed wheel assembly 12 and a pinch wheel assembly 14 as will be further discussed below. The feed wheel assembly 12 and/or the pinch wheel assembly 14 prevents rotation of the transmission box 16 and the motor 18 during the drilling operation. If a drill bit 26 rotates in the direction of arrow 13, then the transmission box 16 and the motor 18 would be urged in the opposite direction as shown by arrow 15. In U.S. patent application Ser. No. 12/009,169 (U.S. Pat. No. 7,658,242), such device contemplates a stabilizer arm shown in FIG. 25 to prevent rotation of the transmission box 16 and the motor 18. In contrast, the core drilling system 10 shown in FIG. 1 does not require the stabilizer arm. Rather, the motor 18 and transmission box 16 are prevented from rotating about a torque tube 19 via the feed wheel assembly 12 and/or the pinch wheel assembly 14. The feed wheel assembly 12 and the pinch wheel assembly 14 also pushes the drill bit 26 toward the substrate 24. Moreover, the core drilling system 10 has a torque tube stabilizing leg assembly 20. This assembly 20 (1) prevents the torque tube 20 and the cut core 22 from falling through the substrate 24 after the drill bit 26 cuts through the substrate 24, (2) reduces vibration during the drilling operation and (3) provides a location for a hoist to carry the core drilling system 10 and the cut core 22 after completion of the drilling operation.

As used herein, the torque tube 19 may have a hollow center along the length of the tube for the purposes of weight reduction and fatigue durability. The hollow center may provide a route through which gas or fluid may travel to address cooling and debris removal issues. It is contemplated that the torque tube 19 may be replaced with a solid shaft when fluid or gas is not passed through the hollow center of the tube 19.

Figure 1A:
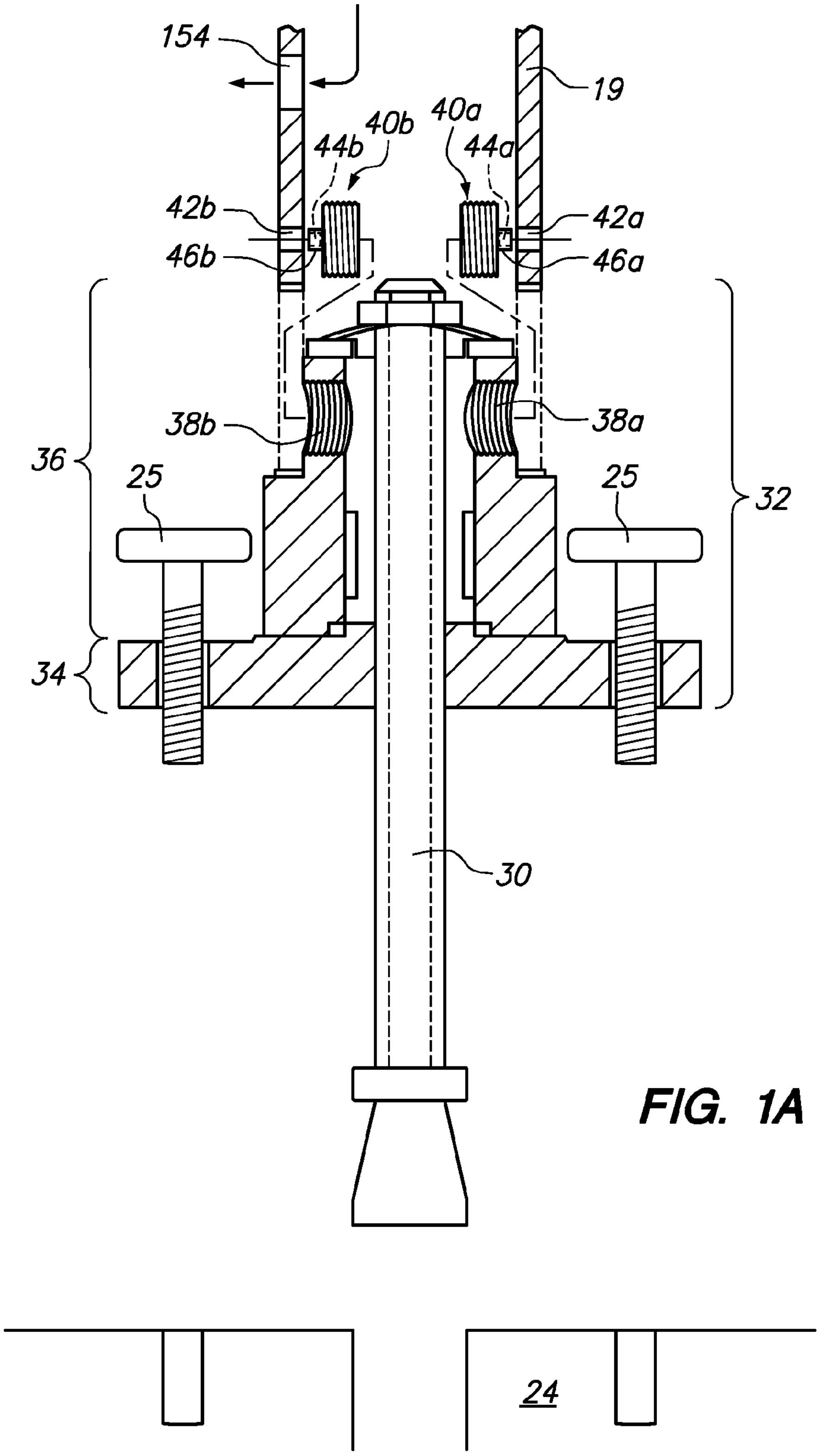
FIG. 1A illustrates a method of securing a torque tube to a substrate.

Referring now to FIG. 1A, the core drilling system 10 is mounted to the substrate 24 by first attaching the torque tube 19 to the substrate 24 with a concrete anchor 30. The concrete anchor 30 is attached to a base 32 having a plate section 34 and a protrusion 36. The protrusion 36 may have two coaxially aligned threaded holes 38*a, b* within which is fitted threaded set screws 40*a, b*. The set screws 40*a, b* are initially threaded fully into the threaded holes 38*a, b*. With the torque tube 19 disposed about the protrusion 36 as shown in FIG. 1A in hidden lines, an allen head is fitted through holes 42*a, b* of the torque tube 19 and received in a hex recess 44*a, b*. The holes 42*a, b* of the torque tube 19 may be aligned to the allen head by forming complementary castellations on the bottom of the torque tube 19 and the protrusion 36. The set screws 40*a, b* are rotated such that nubs 46*a, b* of the set screws 40*a, b* are displaced inside of the holes 42*a, b*. In this way, the torque tube 19 cannot be pulled apart nor rotated with respect to the base 32. Also, the set screws 40*a, b* cannot vibrate out. With the concrete anchor 30 attached to the substrate 24 and the base 32, the torque tube 19 is also secured to the substrate 24. The attachment of the base 32 and the concrete anchor 30 to the substrate 24 locates the general center of the core 22 to be cut out of the substrate 24 since the drill bit 26 rotates about the torque tube 19. Up until the drill bit 26 cuts through the entire substrate 24, the torque tube 19 provides a stable base upon which the motor 18, transmission box 16 can be mounted to guide the direction of the drill bit 26 through the substrate 24.

Figure 2:
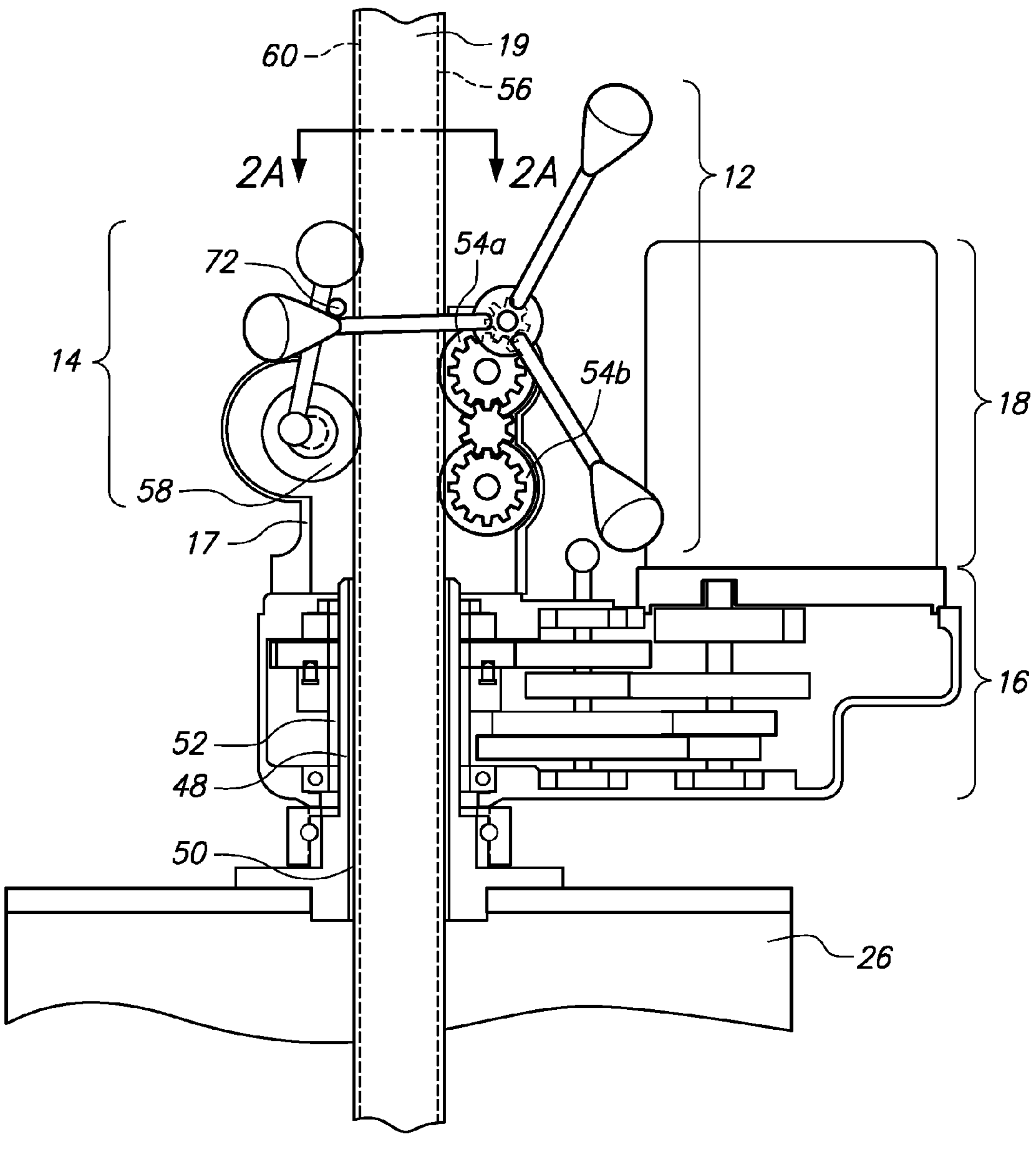
FIG. 2 is a cross sectional view of a drill bit, transmission box and housing for illustrating the pinch wheel assembly and feed wheel assembly.

With the torque tube 19 securely located on the substrate 24, the drill bit 26 which is attached to a hex drive 48 may be disposed about the torque tube 19, as shown in FIG. 2. The hex drive 48 may have a bearing 50 (e.g., bushing, ball bearing, etc.) which permits rotation of the hex drive 48 about the torque tube 19 and aligns the rotational axis of the drill bit 26 to the torque tube 19. The hex drive 48 and the drill bit 26 may also slide along the length of the torque tube 19. The hex drive 48 may have an outer hex configuration which mates with an output drive 52 of the transmission box 16. The output drive 52 may have an inner hex configuration which mates with the hex outer configuration of the hex drive 48. The motor 18 transmits power through the transmission box 16 to the output drive 52 and ultimately to the hex drive 48 and drill bit 26. During cutting operation, the frictional resistance caused by the drill bit 26 and the substrate 24 creates an opposite force that urges the transmission box 16 and the motor 18 in the opposite rotational direction as the drill bit 26 as shown by arrows 13 and 15 in FIG. 1. To counteract this force, the feed wheel assembly 12 and/or the pinch wheel assembly 14 may resist such reverse rotation by transmitting the opposite force to the torque tube 19. The feed wheel assembly 12 may have one or more wheels 54*a, b* that fits within a groove 56 to prevent rotation of the transmission box 16 and motor 18 during the drilling operation. Additionally and/or alternatively, the pinch wheel assembly 14 may also have a wheel or disc 58 that fits within a groove 60 to prevent rotation of the transmission box 16 and motor 18 during the drilling operation. The feed wheel assembly 12 and the pinch wheel assembly 14 are mounted to a housing 17 which is fixedly attached to the transmission box 16.

Figure 2A:
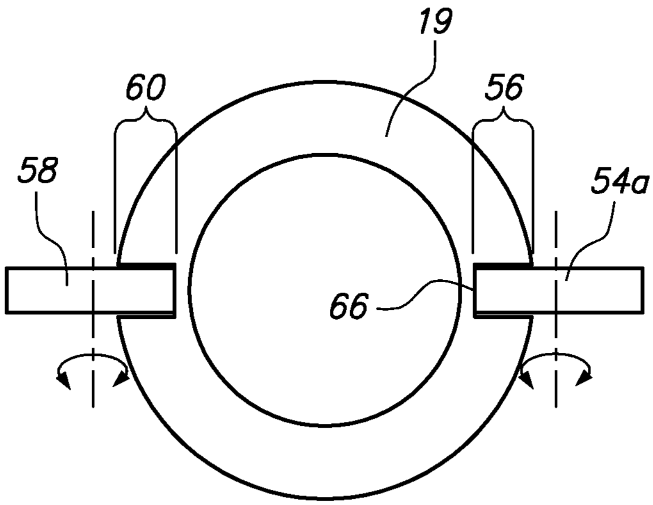
FIG. 2A is a cross sectional view of the torque tube shown in FIG. 2.
Figure 2B:
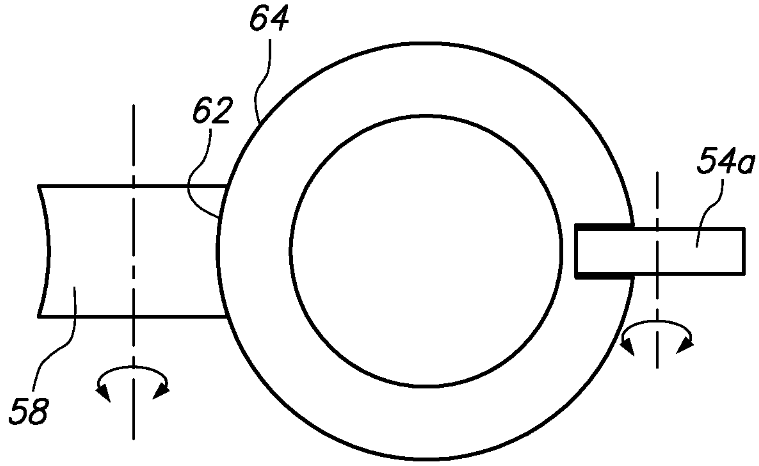
FIG. 2B is an alternate embodiment of a disc of the pinch wheel assembly.

In one aspect, the feed wheel assembly 12 and the pinch wheel assembly 14 may have wheels 54*a, b* and 58 which fits within grooves 56, 60 to prevent rotation, as shown in FIG. 2A. Alternatively, as shown in FIG. 2B, the disc 58 of the pinch wheel assembly 14 may have an outer surface 62 which engages the outer surface of the torque tube 19. In particular, the outer surface 62 of the disc 58 may have a concave semicircular configuration which matches the circular outer surface 64 of the torque tube 19. As will be discussed further below, the pinch wheel assembly 14 serves the purpose of providing frictional contact between the wheels 54*a, b* to the inner surface 66 of the groove 56 such that the feed wheel assembly 12 can apply downward pressure to the drill bit 26 toward the substrate 24.

Referring now to FIG. 3, the pinch wheel assembly 14 is shown acting against the torque tube 19. Referring now to both FIGS. 3 and 3A, the pinch wheel assembly 14 has the disc 58 which may pivot about rotational axis 68 as can be seen in FIGS. 3 and 3A. The disc 58 rotates about rotational axis 69. The disc 58 can be traversed closer to the torque tube 19 or further away from the torque tube 19 via the handle 70. As the handle 70 is rotated, the angular relationship of the disc 58 about the rotational axis 68 is varied. When the angular relationship of the disc 58 about the rotational axis 68 is at zero degrees as indicated in FIG. 3 by the solid line, the disc 58 is closest to the torque tube 19. As the handle 70 is further rotated, the disc 58 either rotates in the positive direction or the negative direction as shown and indicated in FIG. 3 by the small dash line or large dash line and the disc 58 moves or traverses away from the torque tube 19.

The pinch wheel assembly 14 serves to tighten the feed wheel assembly 12 against the torque tube 19. To this end, the handle 70 is initially rotated away from the position shown in FIG. 3 in the counterclockwise direction. The transmission box 16 is disposed over the torque tube 19 and the output drive 52 of the transmission box 16 is engaged to the hex drive 48. In this position, the wheels 58*a, b* are received into the groove 56 but is still loose. The disc 58 may be received in groove 60 depending on the configuration of the disc 58 (see FIGS. 2A and 2B). To tighten the assembly, the handle 70 shown in FIG. 3 is then rotated in the clockwise direction. When the disc 58 contacts the torque tube 19 and the wheels 54*a, b* contact the inner surface 66 of the groove 56, the angular rotation of the disc 58 with respect to the rotational axis 68 is preferably at twenty (20) degrees as shown in FIG. 3. The angle of the disc 58 is defined by a line intersecting the rotational axis 68 and the rotational axis 69 and a line perpendicular to the central axis 67 of the torque tube 19. As the handle 70 is further rotated in the clockwise direction, the disc 58 pushes against the torque tube 19. The torque tube 19 which may preferably be hollow as shown in FIGS. 2A and 2B begins to bend or deflect to allow continued rotation of the handle 70 in the clockwise direction and continued traversal and frictional engagement of the disc 58 toward the torque tube 19. The disc 58 and the wheels 54*a, b* apply opposing forces to the torque tube 19 which is greatest when the angular rotation of the disc 58 is at zero degrees. Once the angular rotation of the disc 58 enters negative territory, the disc 58 begins to traverse away from the torque tube 19 and the torque tube 19 attempts to resume its original circular shape. When the angular rotation of the disc 58 is at negative ten degrees, a pin 72 prevents further rotation of the handle 70 in the clockwise direction. The disc 58 is in the over center position. The pin 72 prevents rotation of the disc 58 and the handle 70 in the clockwise direction about the rotational axis 68. The over center position of the disc 58 prevents counterclockwise rotation of the disc 58 about the rotational axis 68. The disc 58 is now locked into position. The disc 58 and the wheels 54*a, b* are now snuggly and tightly fitted against the torque tube 19.

As the transmission box 16, motor 18, pinch wheel assembly 14, and feed wheel assembly 12 move along the length of the torque tube 19, the disc 58 is allowed to rotate about rotational axis 69 on the bearing 74. This is to prevent counterclockwise rotation of the disc 58 about the rotational axis 68 as the transmission box 16 is being driven downward. The pinch wheel assembly 14 is shown such that the over center position is reached as the handle 70 and the disc 58 rotate in the clockwise direction. However, it is also contemplated that the pinch wheel assembly 14 may be reversed such that the disc 58 reaches the over center position at positive ten degrees instead of negative ten degrees as shown in FIG. 3.

Figure 4:
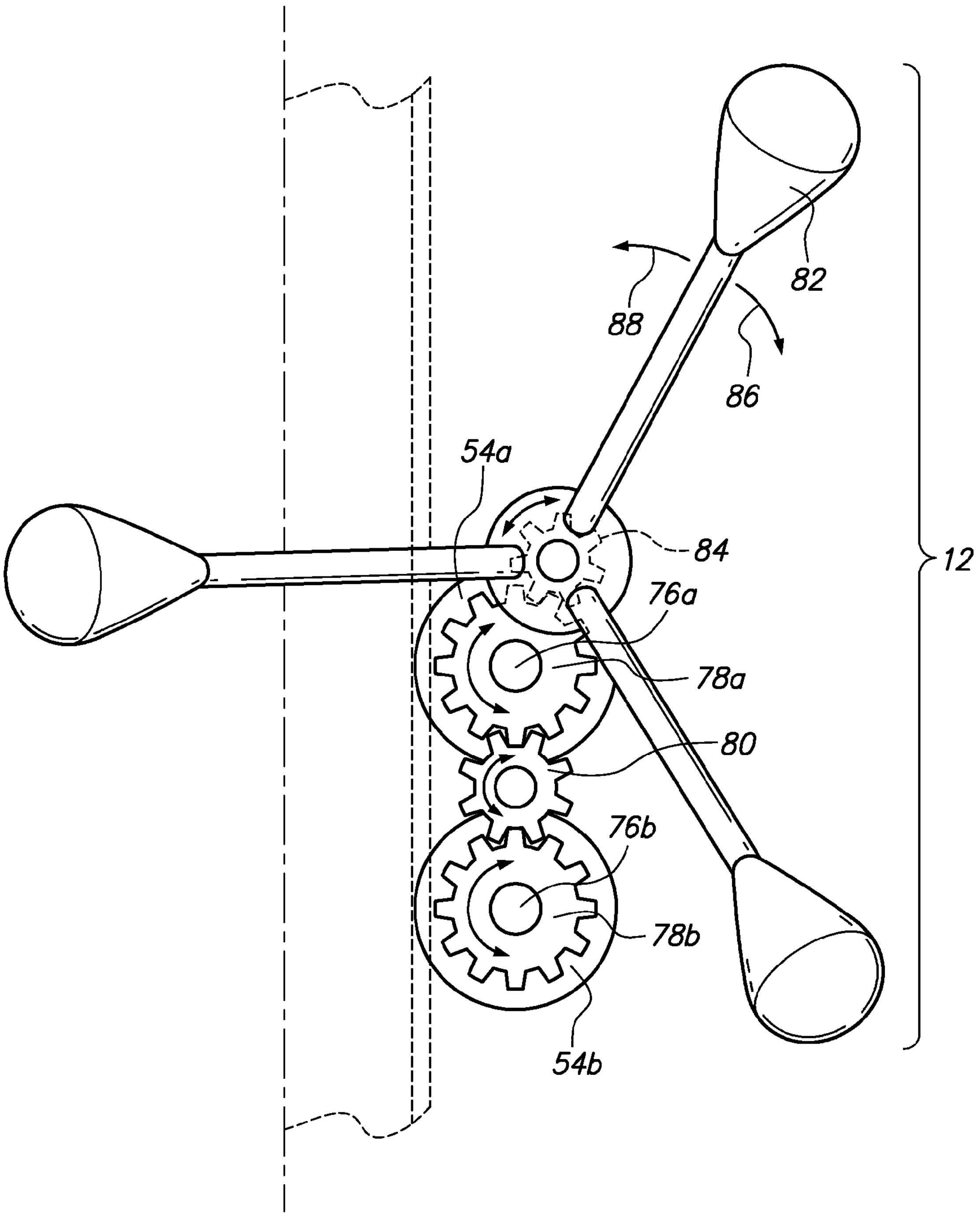
FIG. 4 illustrates a front plan view of the feed wheel assembly.

Referring now to FIG. 4, the feed wheel assembly 12 is shown. The wheels 54*a, b* are rotationally mounted to pins 76*a, b*. The wheel 54*a* is fixedly attached to the gear 78*a* which engages idler gear 80 which engages gear 78*b*. The gear 78*b* is fixedly attached to wheel 54*b*. A handle 82 of the feed wheel assembly 12 is attached to gear 84 which engages gear 78*a*. When the handle 82 is rotated in the clockwise direction shown by arrow 86, the gear 84 being fixedly attached to the handle assembly 82 also rotates in the clockwise direction. The gear 78*a* rotates in the opposite direction, namely, the counterclockwise direction. The idler gear 80 rotates in the clockwise direction and the gear 78*b* rotates in the counterclockwise direction. The wheels 54*a, b* follow the rotational direction of the gears 78*a, b* since they are fixedly attached to each other. Conversely, when the handle 82 is rotated in the counterclockwise direction shown by arrow 88, the gears 84, 78*a, b* effectuate clockwise rotation of the wheels 54*a, b*.

With the pinch wheel assembly 14 in the over center position, the disc 58 of the pinch wheel assembly 14 and the wheels 54*a, b* of the feed wheel assembly 12 are pressed against the torque tube 19. The wheels 54*a, b* press against the inner surface 66 of the groove 56. The wheels 54*a, b* are in frictional engagement with the inner surface 66. As such, when the handles 82 are rotated in the counterclockwise direction 88, the wheels 54*a, b* track down toward the substrate 24. The disc 58 rotates about rotational axis 69 on the bearing 74. Rotation of the handle 82 applies downward pressure of the drill bit 26 to the substrate 24. After the drill bit 26 has drilled through the substrate 24 (e.g., concrete), the feed wheel assembly 12 may be rotated in the opposite direction, namely, in the direction shown by arrow 86 to raise or traverse the transmission box 16 and motor 18 away from the substrate 24. In other embodiments, the transmission box 16 is also removably attachable to the hex drive 48 and the drill bit 26. When attached, the traversal of the transmission box and motor 18 via the feed wheel assembly 12 also raises or traverses the drill bit 26 out of the newly cut hole.

Figure 5A:
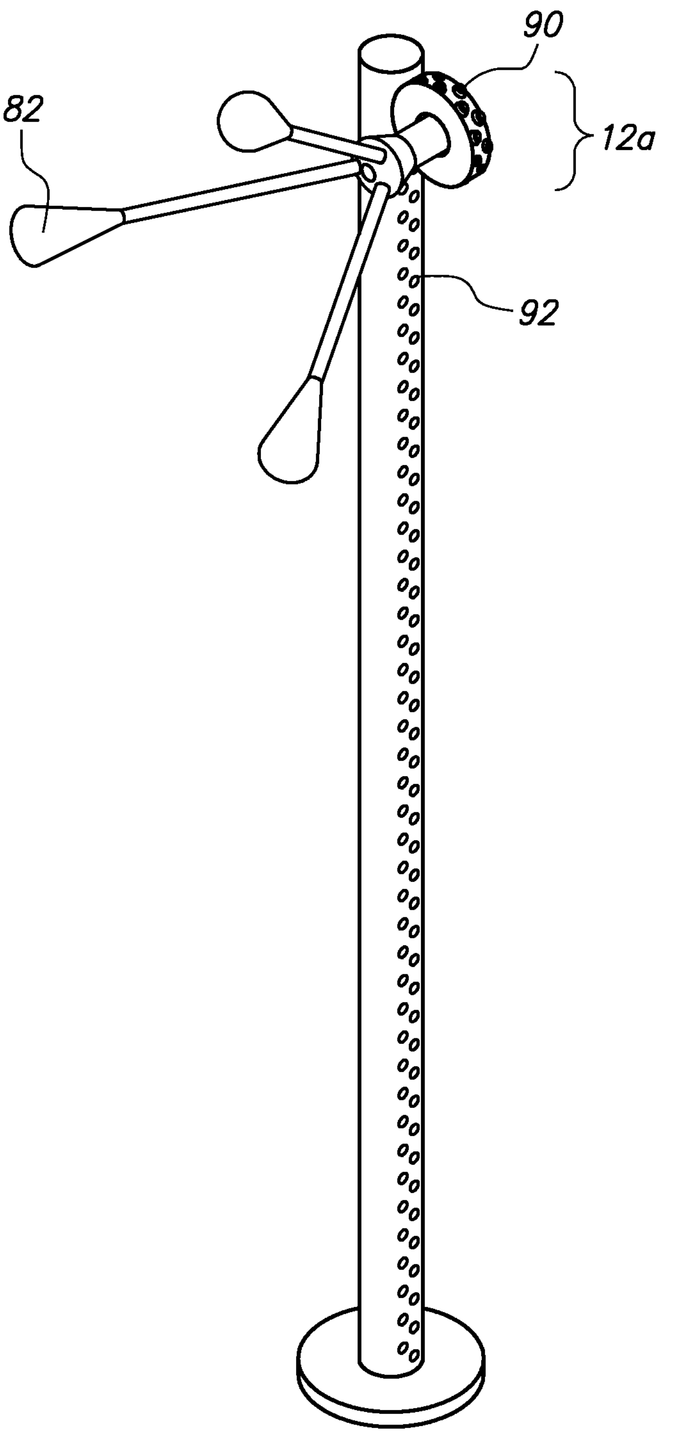
FIG. 5A illustrates an alternate embodiment of the feed wheel assembly.
Figure 5B:
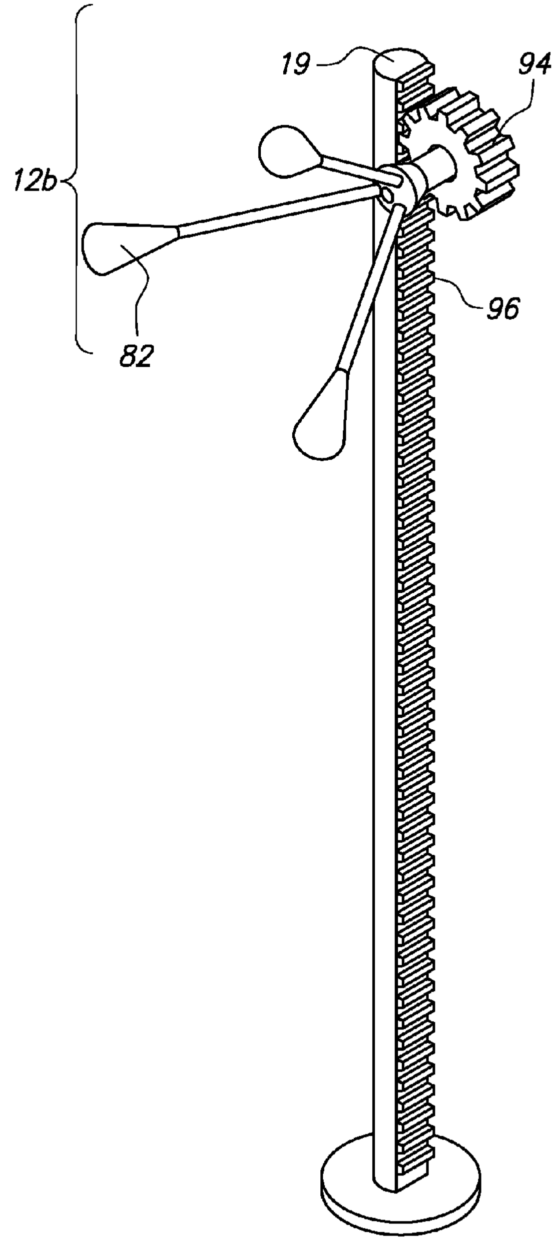
FIG. 5B illustrates a further alternate embodiment of the feed wheel assembly.
Figure 5C:
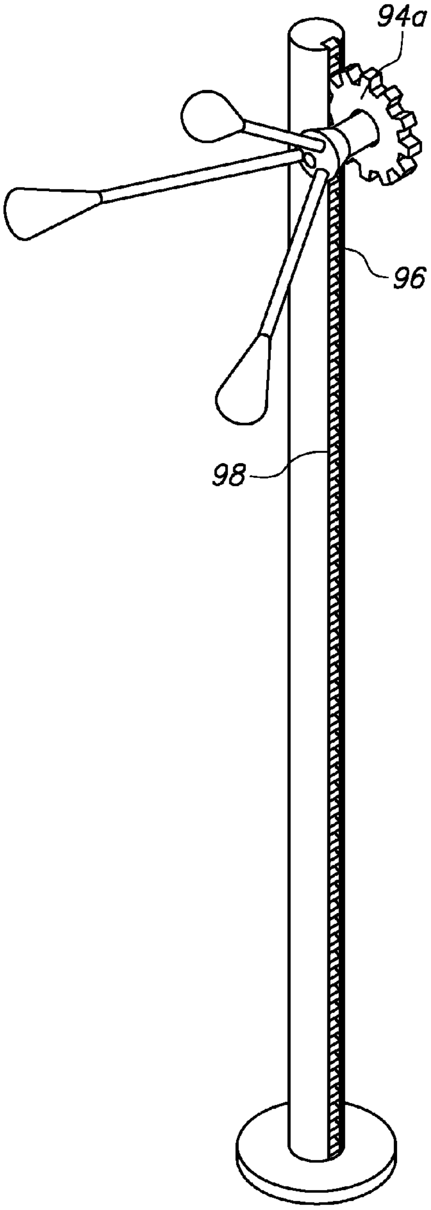
FIG. 5C illustrates a further alternate embodiment of the feed wheel assembly.

Referring now to FIGS. 5A-D, four different alternative embodiments for preventing rotation of the transmission box 16 and motor 18 and also applying pressure to the drill bit 26 against the substrate 24 are shown. FIG. 5E illustrates one embodiment for preventing rotation of the transmission box 16 and the motor 18. In FIG. 5A, the feed wheel assembly 12*a* may have a plurality of pins 90 that may fit within holes 92. As the handle 82 is rotated, the pins 90 engage and disengage the holes 92. In this manner, the inter engagement between the pins 90 and the holes 92 prevent rotation as well as feeds the drill bit 26 into the substrate 24. In FIG. 5B, the feed wheel assembly 12*b* may have a pinion 94 that engages a rack 96 formed on one side of the torque tube 19. Rotation of the handle 82 feeds the drill bit 26 into the substrate 24 or out of the substrate 24. The flat surfaces of the pinion 94 and rack 96 prevent rotation of the transmission box 16 about the torque tube 19. Similarly, as shown in FIG. 5C, the rack 96 may be formed in a groove 98. The pinion 94*a* engages the groove 98 to prevent rotation of the transmission box 16.

In FIG. 5D, the transmission box 16 may be mounted to an extension tube 100. The upper portion of the extension tube 100 may have a fixed splined portion 102 within the extension tube or fixedly attached thereto. A nut 104 with a handle 106 for rotating the nut 104 may be disposed above the splined portion 102. The torque tube 19 may have an upper threaded portion 108 which is also splined. With the drill bit 26 resting on the substrate 24, the transmission box 16 may be disposed over the hex drive 48. The splined portion 102 engages the splined and threaded portion 108 of the torque tube 19. The threaded nut 104 also engages the splined and threaded portion 108 of the torque tube 19. When the motor 18 rotates the drill bit 26, the drill bit 26 applies an equal and opposite force to the transmission box 16 that urges the transmission box 16 in the opposite direction. The inter engagement between the splined portion 102 and the splined and threaded portion 108 of the torque tube 19 prevents rotation of the transmission box 16. To apply downward pressure on the drill bit 26 to the substrate 24, the nut 104 is rotated by handle 106 to further engage the nut 104 to the threaded portion 108. After the drilling operation is performed, the nut 104 which may be rotatable attachable to the extension tube 100 may be reversed which lifts the transmission box 16 and the motor 18 up off of the torque tube 19. Please note that the nut 104 may be rotatable attachable to the splined portion 102 in that the nut 104 may rotate about a central axis of the splined portion 102 yet cannot be removed from the extension tube 100 or the splined portion 102. By way of example and not limitation, the nut 102 may be caged between two thrust washers within the extension tube 100 above the splined portion 102. It is also contemplated that the reversal of the nut 104 may also lift up the drill bit 26. To this end, the transmission box 16 may engage the hex drive 48 with a spring loaded pin 110. The spring loaded pin 110 may engage a groove 112 formed in the hex drive 48. When the transmission box 16 is attached to the hex drive 48 through the pin 110 and the groove 112 inter engagement, reversal of the nut 104 off the torque tube 19 also lifts the drill bit 26 off of the torque tube 19. Other means of lifting the drill bit 26 and transmission box 16 are also contemplated.

The other embodiments disclosed herein may include the spring loaded pin 110. Also, a groove 112 may be formed in the hex drive 48 in relation to the various drill bits 26 disclosed herein. The spring loaded pin 110 may engage the groove 112 formed in the hex drives 48 of the other embodiments. Traversal of the transmission box 16 up and down the torque tube 19 also traverses the drill bit 26 up and down the torque tube 19. To lift the drill bit 26 and transmission box 16 away from the substrate 24, the handle 82 of the feed wheel assembly 12, 12*a* and 12*b* may rotated in the opposite direction.

In FIG. 5E, a key 113 merely slides within groove 115 of the torque tube 19. The key 113 is fixedly attached to the housing 17 to withstand rotational forces.

Figure 6:
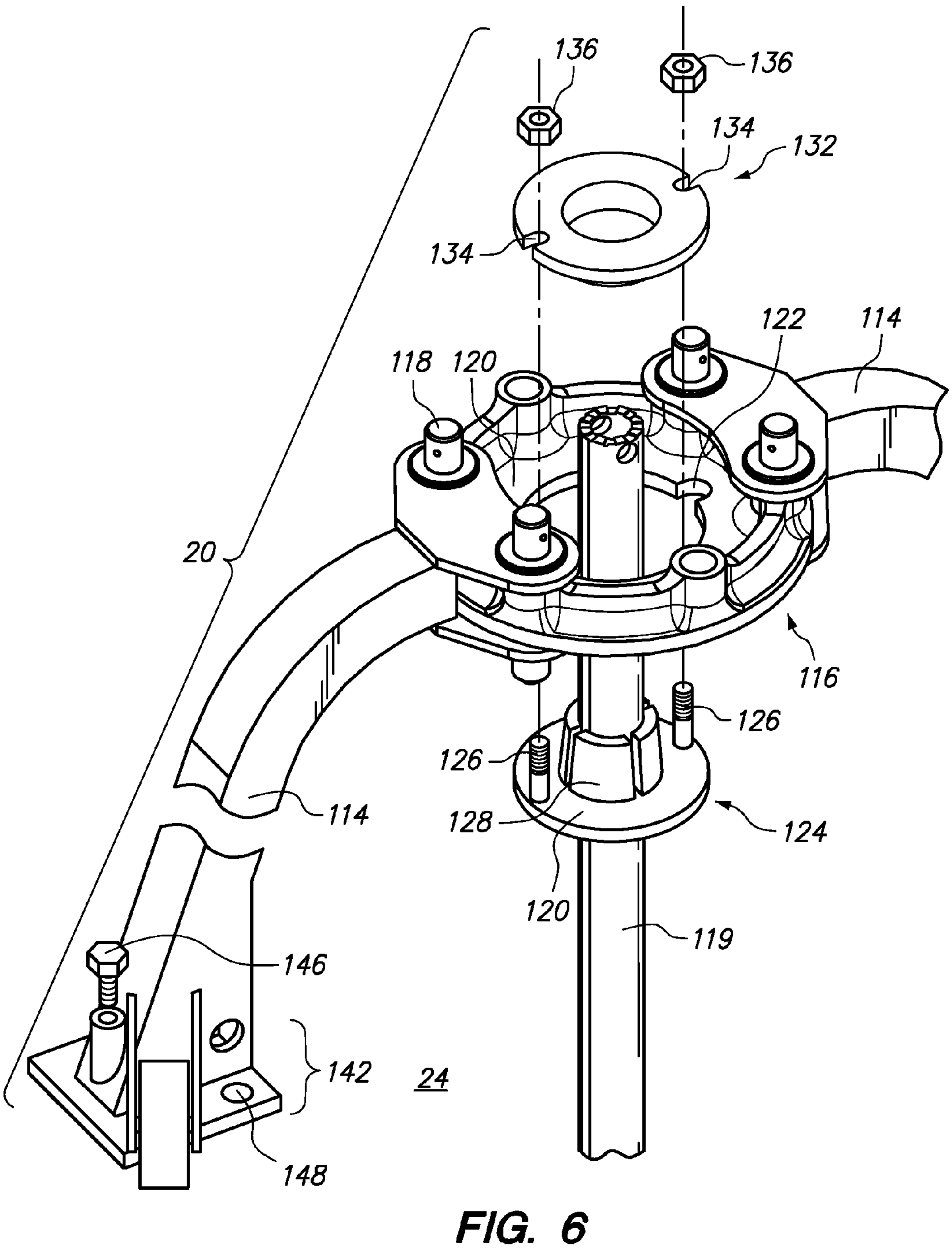
FIG. 6 is an exploded view of a clamp of the torque tube stabilizing leg assembly.
Figure 7:
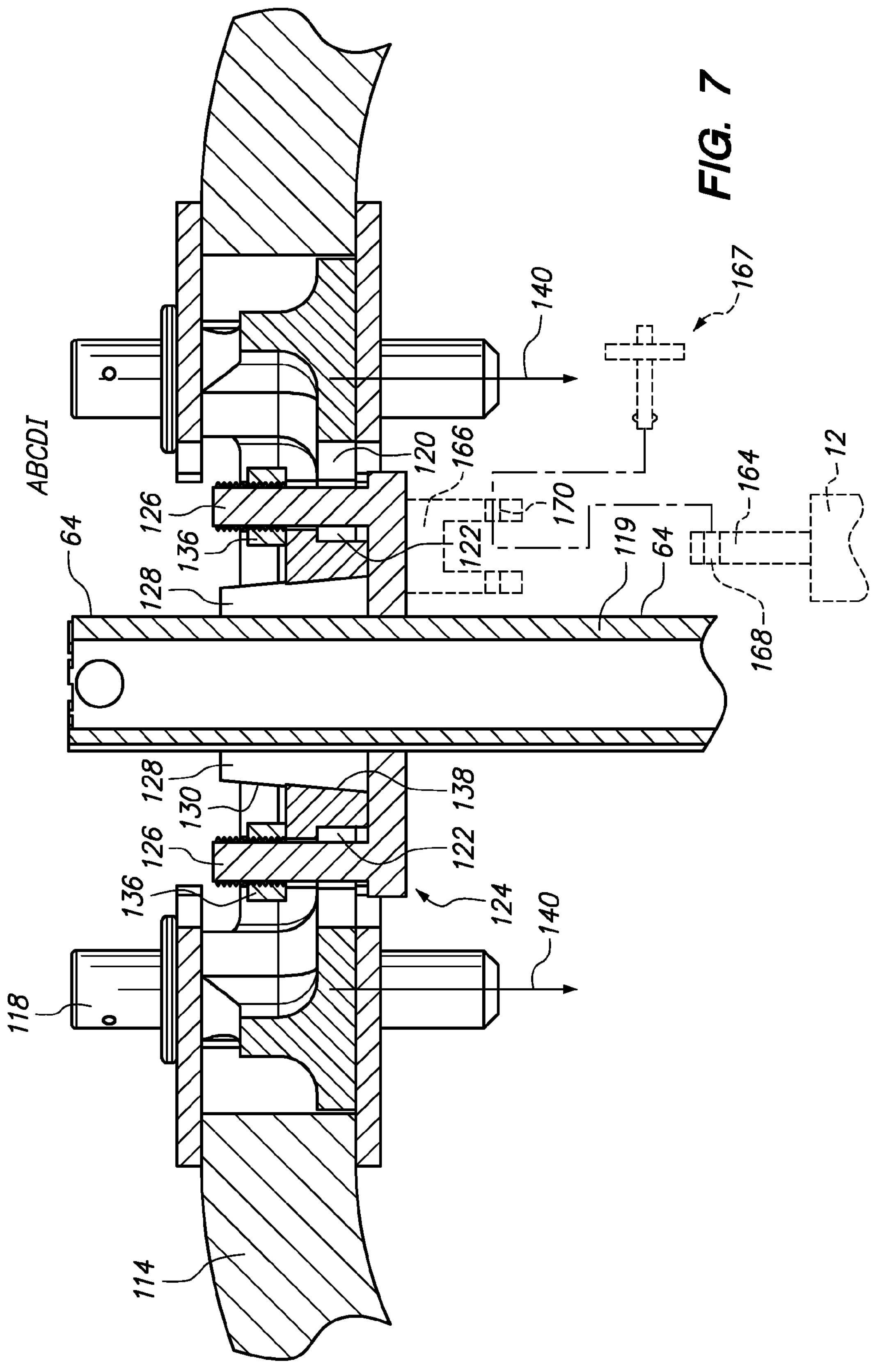
FIG. 7 is a cross sectional view of the clamp and legs of the torque tube stabilizing leg assembly shown in FIG. 6.

Referring now to FIGS. 6 and 7, the torque tube stabilizing leg assembly 20 is shown. The assembly 20 has one or more legs 114 which can be selectively attached to a ring 116 via pins 118. The pins 118 may be adjustable diameter bolts, nut and bolt connections, ball lock pins, etc. The assembly 20 shown in FIG. 6 has two legs 114 on opposing sides of the ring 116. Referring briefly back to FIG. 1, it is also contemplated that the assembly 20 may have three legs 114 equidistantly spaced apart about the ring 116. One leg 114 may be attached to two holes and spread about the ring 116 at intervals of one-hundred-twenty degrees. Alternatively, only one leg 114 may be attached to the ring 116 (see FIG. 10).

Figure 8:
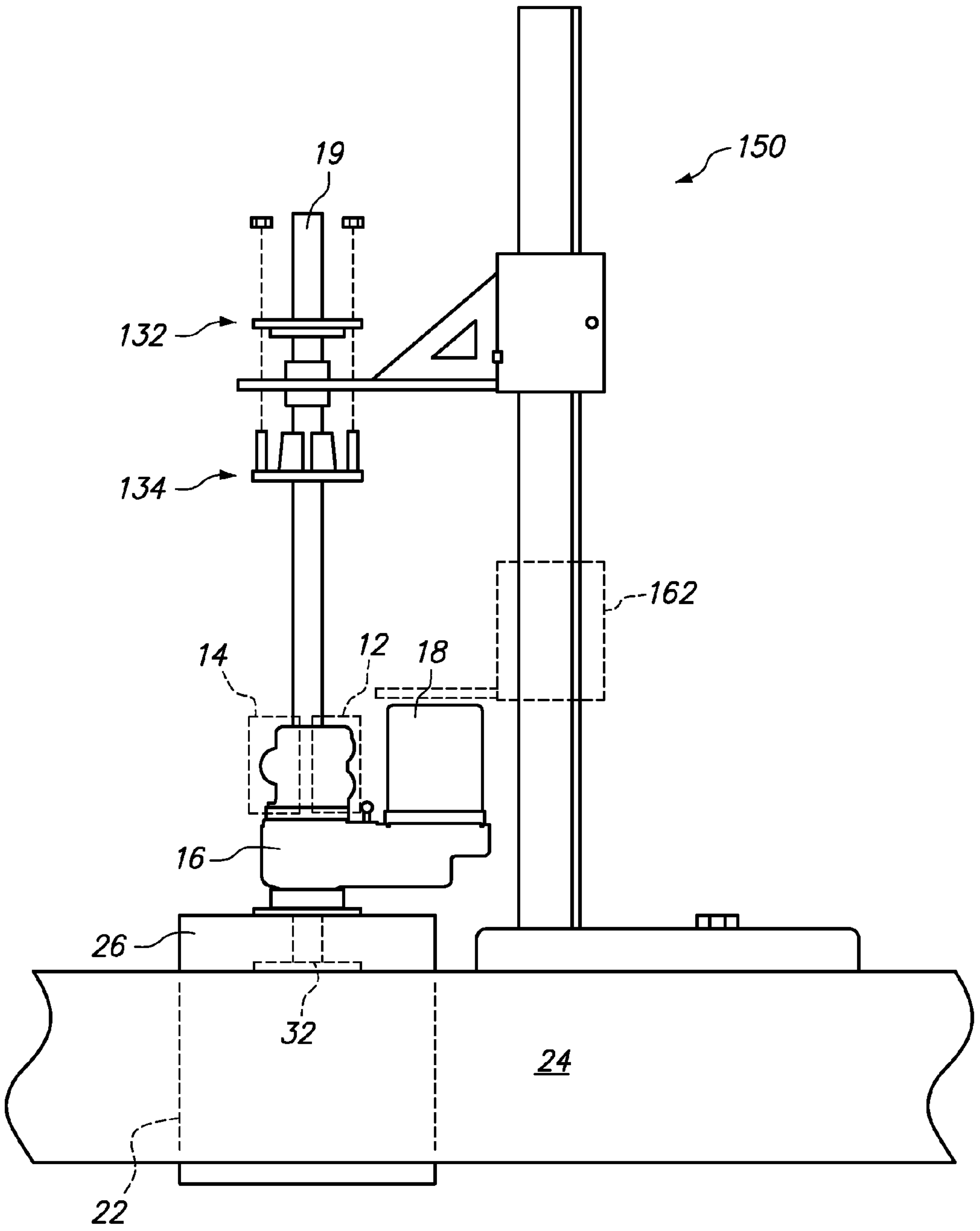
FIG. 8 illustrates the core drilling system utilizing a standard rig as a torque tube stabilizing leg assembly or a means for positioning the torque tube when the torque tube is not anchored to the substrate.

The ring 116 is secured to the distal free end portion of the torque tube 119 in the following manner. Referring now to FIGS. 6 and 7, the ring 116 may have a central plate 120 with recesses 122 about an inner periphery of a hole formed in the plate 120. A clamp first part 124 may be disposed below the plate 120 of the ring 116. Threaded studs 126 may be fed through the recesses 122. The clamp first part 124 may additionally have a plurality (e.g., four) of wedge portions 128. Outer surfaces 130 of the plurality of wedge portions 128 may form a conical shape as shown in FIG. 8. These plurality of wedge portions 128 may deflect inwardly with the application of pressure as will be described below. The wedge portions 128 also collectively define an inner periphery which matches the outer surface of the torque tube 119. Preferably, the inner surface of the wedge portions 128 snuggly fit onto the outer surface 64 of the torque tube 119. With the clamp first part 124 disposed about the torque tube 119, the ring 116 disposed about the torque tube 119 and disposed above the clamp first part 124, a clamp second part 132 is disposed on top of the plate 120 of the ring 116. The threaded studs 126 are received into recesses 134 of the clamp second part 132. Nuts 136 are threaded onto the threaded stud 126. The clamp second part 132 has an inner peripheral surface having a conical shape matched to the conical outer surface 130 of the wedge portions 128. The nuts 136 are tightened onto the threaded stud 126. As the nuts 136 are being engaged to the threaded stud 126, the clamp second part 132 traverses closer to the clamp first part 124. The conical configuration of the wedge portions 128 are urged inwardly into further frictional contact with the outer surface 64 of the torque tube 119. The inner surfaces of the wedge portions 128 frictionally engage the outer surface 64 of the torque tube 119 to an extent that frictional engagement can lift the motor 18, transmissions box 16, drill bit 26 and the cut core 22. Further engagement of the nut 136 into the threaded stud 126 will push the ring 116 toward the substrate 24 in the direction of arrow 140 shown in FIG. 8. The bases 142 (see FIG. 6) of the legs 114 push down on the substrate 24. If further pressure is required, then jacking screws 146 may be extended toward the substrate 24 to lift the bases 142. As such, this setup provides for stabilization of the free distal end portion of the torque tube 119 via the legs 114 and clamping of the free distal end portion of the torque tube 119. To further stabilize the legs 114, the user may bolt the bases 142 of the legs to the substrate 24 via the holes 148. When the bases 142 of the legs 114 are bolted to the substrate, the legs 114 and the torque tube stabilizing leg system 20 additionally absorbs rotational energy when the drill bit 26 has cut through the entire substrate 24.

Referring now to FIG. 8, an alternate means of stabilizing the free distal end portion of the torque tube 119 is shown. In this example, the torque tube 119 is stabilized with a standard drilling rig 150. The drilling rig 150 is adapted to receive the clamp first part 134 and the clamp second part 132. In this example, the lower end of the torque tube 19 may or may not be secured to the substrate 24. If the torque tube 19 is secured to the substrate 24 as previously discussed, then the cut core 22 would not fall through upon completion of the drilling operation. On the other hand, if the torque tube 19 is not secured to the substrate 24, then the cut core 22 would fall through the substrate 24. However, the drill bit 26, transmission box 16, and motor 18 may be retained by base 32.

Referring now back to FIG. 5D, the transmission box 16 is removably attachable to the driveshaft 48 via a spring loaded pin 110 that is engageable with a groove 112 formed in the driveshaft 48. The spring loaded pin 110 is typically in the engaged position such that the pin 110 is disposed within the groove 112 when no external forces are acting upon the pin 110. To remove the transmission box 16 from the drill bit 26 and the driveshaft 48, the pin 110 is pulled out until the pin 110 disengages the groove 112. At this time, the transmission box 16 may be lifted or separated from the driveshaft 48 and the drill bit 26. This spring loaded pin 110 and groove 112 may be incorporated into the core drilling system shown in FIGS. 1, 2 and 8. By way of example and not limitation, when the spring loaded pin 110 and the groove 112 are incorporated or used in conjunction with the torque tube stabilizing leg assembly 20, the feed wheel assembly 12 in conjunction with the pinch wheel assembly 14 may be used to withdraw the drill bit 26 and the cut core 22 out of the substrate 24. To illustrate, referring to FIG. 1, the transmission box 16 may be attached to the drill bit 26 and the driveshaft 48 (shown in FIG. 1) via the spring loaded pin 110 and the groove 112. After the operator has cut through the substrate 24 with the drill bit 26, the operator may retract the transmission box 16 and the drill bit 26 by reversing rotation of the handle 82. This will raise the transmission box 16 as well as the drill bit 26 out of the cut hole in the substrate 24. The torque tube stabilizing leg assembly 20 prevents the cut core 22 from falling through the substrate 24 if the drill bit 26 has cut through the entire thickness of the substrate 24. Also, the pinch wheel assembly 14 and the feed wheel assembly 12 holds the position of the drill bit 26 and the transmission box 16 on the torque tube 19.

To remove the cut core, referring now to FIGS. 1 and 7, optionally, the feed wheel assembly 12 may have a lug 164 (see FIG. 1). The lug 164 may engage a bracket 166 formed below the clamp first part 124 (see FIG. 7). The lug 164 and the bracket 166 may be removably attached to each other by pin 167 (e.g., cotter pin, ball lock pin, etc.). The lug 164 and bracket 166 may assist in pulling the cut core 22 out of the substrate 24. In particular, after the drill bit 26 has cut through the substrate 24, the cut core 22 is held in place by the attachment of the torque tube 119 to the cut core 22. The user may reverse the handle 82 to lift the drill bit 26 and the transmission box 16 away from the substrate 24. As the user reverses the handle 82, the motor 18 may still be rotating the drill bit 26 to loosen or vibrate the drill bit 26 so that the drill bit 26 may be reversed out between the cut core 22 and the substrate 24. Eventually, the lug 164 approaches the bracket 166 as shown in FIG. 7. Once the aperture 168 of the lug 164 is aligned to aperture 170 of the bracket 166, pin 167 may be inserted through the apertures 168, 170. When the handle 82 is released, the pin 167 holds the transmission box 16 and drill bit 26 in the up position. The user can now loosen nut 136 to release engagement of the wedge portion 128 from the torque tube 19. The user now may rotate handle 82 to lift the torque tube 19 and the cut core 22 out of the substrate 24. With the cut core 22 clearing the substrate 24, the system 10 may be moved away from the hole formed in the substrate 24. The user may release the handle to rest the cut core 22 on the substrate. When the cut core 22 is removed out of the substrate 24, the cut core 22 may be received partially back into the core bit 26. To now remove the core bit 26 off of the cut core 22, the user can rotate the handle to lift the core bit 26 off of the cut core 22. This helps the user in dislodging the drill bit 26 from the cut core 22 since the cut core 22 may not be a perfect cylindrical shape and may frictionally rub against the interior of the drill bit 26. This may be done while the leg assembly 20 or the standard drilling rig 150 is detached off of the torque shaft 19. Now, the drill bit 26, motor and transmission may be removed off of the shaft 19.

Referring now to FIG. 1, the legs 114 of the torque tube stabilizing leg assembly 20 may have a wheel 152. The torque tube 19, drill bit 26, cut core 22 which is attached to the bottom of the torque tube 19, the transmission box 16 and the motor 18 may be tilted and wheeled away utilizing the wheels 152.

Figure 11:
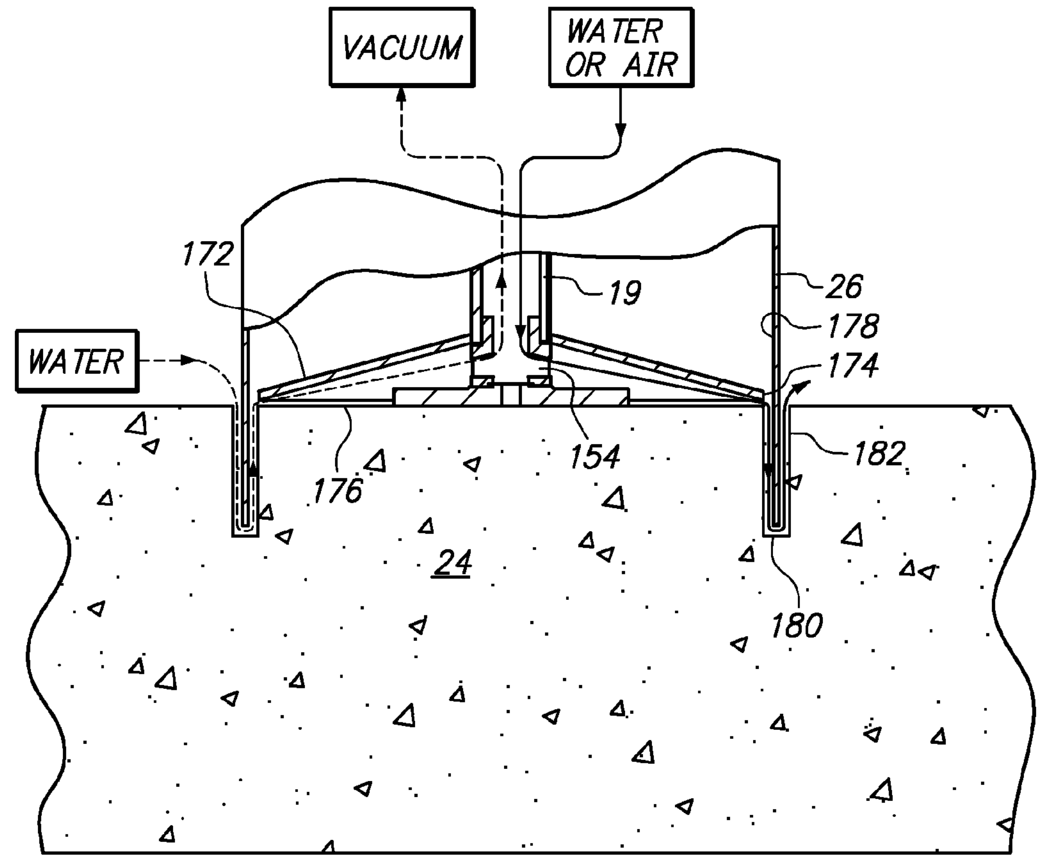
FIG. 11 is a cross sectional view of a hollow torque tube with a bevel disc for providing suction or fluid distribution at a cutting interface of the substrate.

In an aspect of the core drilling system 10, the torque tube 19 may be hollow as shown in FIGS. 1A, 2A, 2B, 6 and 7. A hole 154, as shown in FIG. 1A, may be formed at the lower portion of the torque tube 19. Through this hole 154, water may be introduced into the drill bit 26 or removed from within the drill bit 26 during the drilling operation. Water may be introduced or removed via the top end of the torque tube 19 which is open. This is shown in FIGS. 1 and 6. To remove water through the torque tube 19, a vacuum may be introduced into the drill bit 26 to withdraw dust and/or slurry from within the drill bit 26 through the hole 154. Moreover, referring now to FIG. 11, the torque tube 19 may have a bevel disc 172 that may extend from the torque tube 19 above the hole 154. An outer periphery 174 of the beveled disc 172 may be close to the upper surface 176 of the substrate 24 and an interior surface 178 of the drill bit 26. The drill bit 26 rotates and pressure is applied to the drill bit 26 so that the cutting edge 180 of the drill bit 26 forms a generally round groove 182 in substrate 24. The cutting edge 180 physically removes material from the substrate 24. Water may be introduced through the hollow torque tube 19. The water proceeds through the hole 154 and out of the gap between the outer periphery 174 of the bevel disc 172 and the upper surface 176 of the substrate 24. If the upper surface 176 is tilted and not horizontal, the water fills up the space between the bevel disc 172 and the upper disc 176 so that the water may squirt outward from under the bevel disc 172 toward the groove 182 formed in the substrate 24 even at the higher side. Pressure is created adjacent the groove 182 to flow water down and out to the exterior of the drill bit 26 to remove particulate matter (e.g., concrete dust) of the substrate 24 from out of the groove 182. Instead of water, air may also be forced through the hollow tube 19 to blow the particulate matter of the substrate 24 out of the groove 182. It is also contemplated that a vacuum may be formed so as to suck water or air through the groove 182 to remove particulate matter by the substrate 24 from the groove 182. The particulate matter is sucked through the hole 154, up through the tube 19. To vacuum water or a slurry of concrete dust through the tube 19, water may be introduced adjacent the groove 182 on the exterior side of the drill bit 26.

Figure 9:
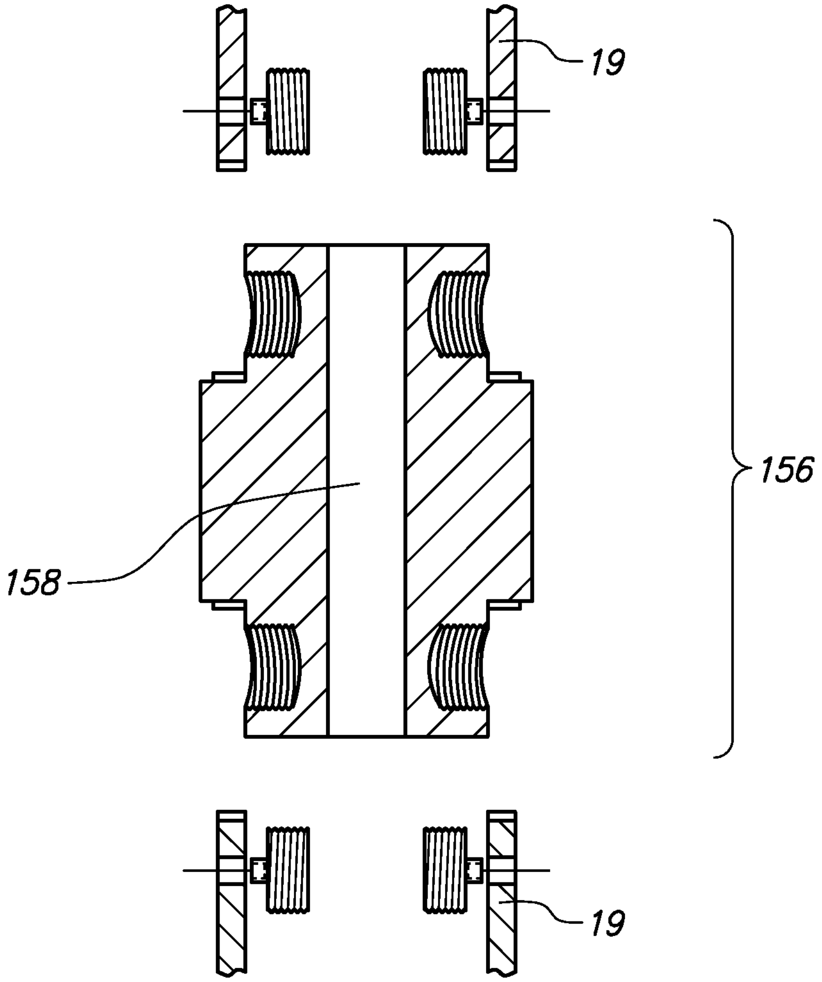
FIG. 9 illustrates a connector for connecting two torque tubes.

Referring now to FIG. 9, the torque tube 19 may be extended for deeper holes. To this end, two torque tubes 19 may be attached to each other with a connector 156. The connector operates substantially similar to the base 32 shown in FIG. 1A. The connector 156 additionally has a through hole 158 to allow water or cooling fluid to flow through the torque tubes 19. The ends of the torque tube 19 that engages the connector 156 may be castellated and fit within a complementary castellated configuration on the connector 156.

Figure 10:
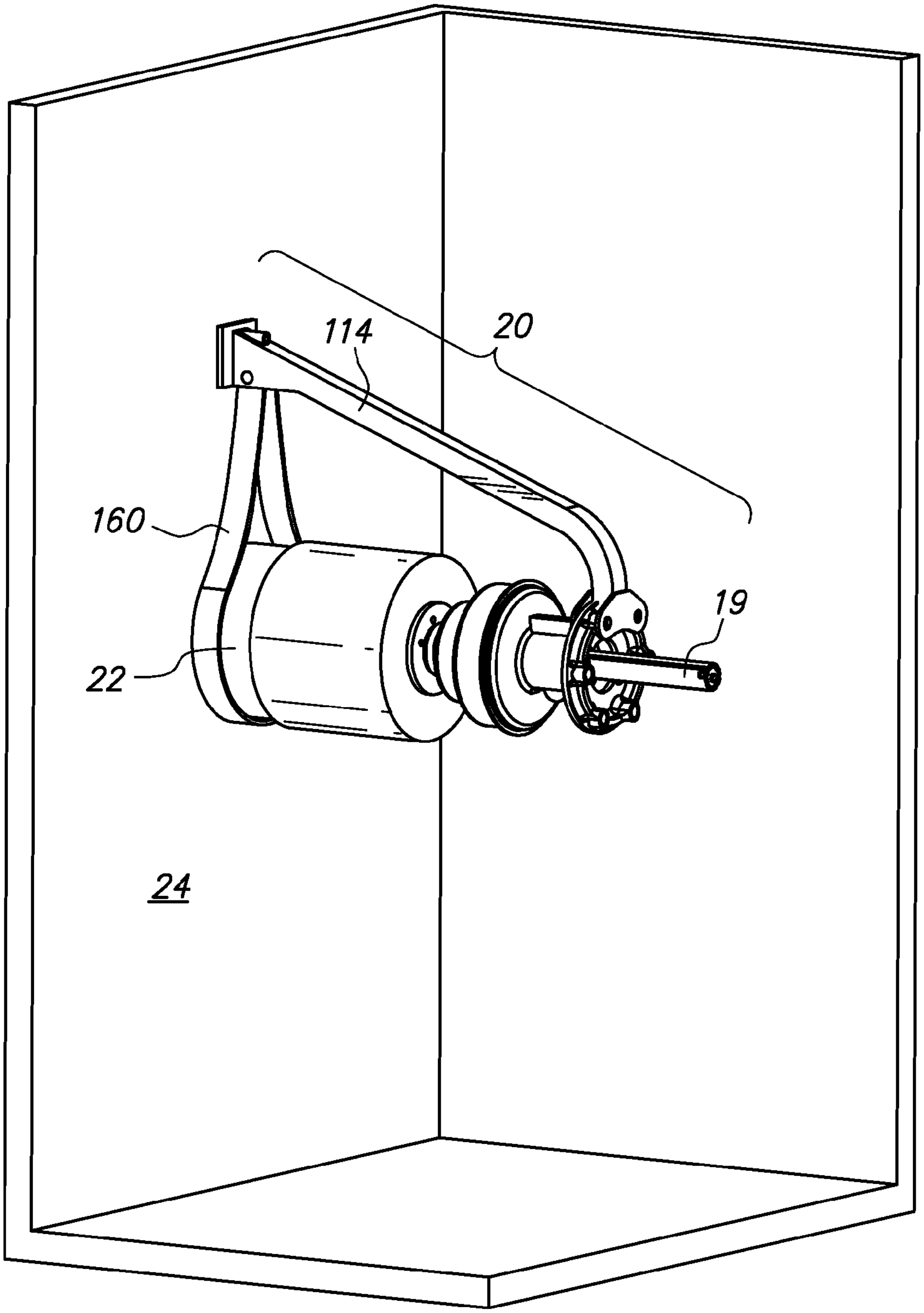
FIG. 10 illustrates the core drilling system mounted to a vertical substrate.

Referring now to FIG. 10, the torque tube stabilizing leg assembly 20 may comprise a single leg 114 attached to the torque tube 19 via the clamp discussed above. The torque tube 19 is secured to a vertical wall for drilling a horizontal hole through such vertical wall or substrate. The leg 114 may be bolted or secured to the vertical substrate 24 via any means known in the art. Additionally, the core drilling system 10 may have a strap 160 for hoisting the cut core 22. The vertical wall may be drilled in the same fashion as discussed herein in relation to drilling a horizontal substrate.

Referring back to FIG. 8, an alternative embodiment is shown in hidden lines. In particular, it is contemplated that the torque tube is not clamped or otherwise secured to the drilling rig 150. The torque tube 19 may however be attached or secured to the substrate 24 as shown in FIG. 1A or through other means. The carriage 162 may be secured (e.g., welded, bolted, etc.) to the motor 18 or the transmission box 16 to aid in pressing the drill bit 16 into the substrate 24. When the drill bit 26 penetrates the substrate 24, the cut core 22 will drop down when drilling a generally vertical hole. Fortunately, the pinch wheel assembly 14 may be engaged such that the disc 58 and wheels 54*a, b* of the feed wheel assembly 12 are frictionally engaged to the torque tube 19. The user may hold or control the handle 82 of the feed wheel assembly 12 to prevent the cut core 22 from falling down. The cut core 22 is secured to the torque tube 19. The torque tube 19 is frictionally secured to the pinch wheel assembly 14 and the feed wheel assembly 12. The pinch wheel assembly 14 and the feed wheel assembly 12 is secured to the motor 18 and/or the transmission box through housing 17. The motor 18 and/or the transmission box 16 is secured to the carriage 162 as discussed above.

The above description is given by way of example, and not limitation. Given the above disclosure, one skilled in the art could devise variations that are within the scope and spirit of the invention disclosed herein, including various ways of attaching a motor and transmission box to the torque tube. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A coring apparatus for forming a hole in a substrate, the apparatus comprising:
- an elongate torque shaft attachable to a section of the substrate to be cut, the shaft having a cylindrical outer surface and a groove extending along a length of the shaft;
- a core bit baying a cylindrical configuration, a first end of the core bit having a cutting configuration for forming an outer periphery of the hole to be cut into the substrate, a second end of the core it having a bearing rotatable on the outer surface of the elongate toque shaft to align the core bit to the substrate and slidable on the outer surface to traverse the core bit along the length of the shaft;
- a transmission attachable to a motor for transmitting power from the motor to an output of the transmission, the output of the transmission coupled to the core hit for imparting rotation of the core bit about the elongate torque shaft;
- a key fixed to the transmission and slideably disposable within the groove of the elongate torque shaft to prevent rotation of the transmission and/or motor about the torque shaft during rotation of the core bit.

2. The apparatus of claim further comprising at least one kg supported or attached to the substrate and fixed to a free end portion of the torque shaft.

3. The apparatus of claim 2 wherein the kg is attached to the free end portion of the torque shaft with a spat conical collar disposed about the torque shaft.

4. The apparatus of claim further comprising a means for stabilizing the free end portion of the torque shaft.

5. The apparatus of claim 1 further comprising a pinch wheel feed assembly comprising:
- the key;
- a pinch wheel disposed on an opposite side of the elongate shaft with respect to the key.

6. The apparatus of claim wherein the kg is a standard drilling rig.

7. The apparatus of claim 1 wherein the torque shaft is hollow through a central axis of the shaft or the torque shaft is solid.

8. The apparatus of claim 1 wherein the cote bit is a concrete core bit.

9. A coring apparatus for forming as hole in as substrate, the apparatus comprising:
- an elongate torque shaft attachable to a section of the substrate to be cut, the shaft having a cylindrical outer surface;
- a core hit having a cylindrical configuration, a first end of the core bit having a cutting configuration for forming an outer periphery of the hole to be cut into the substrate, a second end of the core bit having a bearing rotateable on the outer surface of the elongate torque shaft to align the core bit to the substrate and slidable on the outer surface to traverse the core bit along the length of the shaft;
- a transmission attachable to as motor for transmitting power from the motor to an output of the transmission, the output of the transmission coupled to the core bit for imparting rotation of the core bit about the elongate torque shaft;
- a means for preventing rotation of the transmission and/or motor about the torque shaft during rotation of the core bit.

10. The coring apparatus of claim 9 wherein the means for preventing rotation is a key and groove, pins and holes, rack and pinion, spline or combination thereof.

* * * * *